(12) United States Patent
Kokuga

(10) Patent No.: US 12,102,071 B2
(45) Date of Patent: Oct. 1, 2024

(54) LURE WITH INTERNAL OSCILLATING BODY

(71) Applicant: Shimano Inc., Osaka (JP)

(72) Inventor: Kimio Kokuga, Osaka (JP)

(73) Assignee: Shimano Inc., Osaka (JP)

( * ) Notice: Subject to any disclaimer, the term of this patent is extended or adjusted under 35 U.S.C. 154(b) by 165 days.

(21) Appl. No.: 17/903,454

(22) Filed: Sep. 6, 2022

(65) Prior Publication Data

US 2023/0165229 A1 Jun. 1, 2023

(30) Foreign Application Priority Data

Nov. 26, 2021 (JP) ................. 2021-192516

(51) Int. Cl.
*A01K 85/01* (2006.01)
*A01K 85/00* (2006.01)
*A01K 85/18* (2006.01)

(52) U.S. Cl.
CPC .......... *A01K 85/015* (2022.02); *A01K 85/011* (2022.02); *A01K 85/18* (2013.01); *A01K 85/1837* (2022.02)

(58) Field of Classification Search
CPC .... A01K 85/011; A01K 85/015; A01K 85/18; A01K 85/1837
USPC ........................................... 43/17.6
See application file for complete search history.

(56) References Cited

U.S. PATENT DOCUMENTS

| | | | | |
|---|---|---|---|---|
| 1,390,601 A * | 9/1921 | Caldwell | ................ | A01K 85/18 |
| | | | | 43/42.3 |
| 1,477,756 A * | 12/1923 | Heddon | ................ | A01K 85/18 |
| | | | | 43/42.34 |
| 2,950,559 A * | 8/1960 | Nelson | ................ | A01K 85/16 |
| | | | | 43/42.47 |
| 4,831,767 A * | 5/1989 | Pearce | ................ | A01K 85/18 |
| | | | | 43/42.3 |
| 5,035,075 A * | 7/1991 | Pearce | ................ | A01K 85/18 |
| | | | | 43/42.3 |
| 5,299,107 A * | 3/1994 | Ratcliffe | ................ | A01K 85/01 |
| | | | | 200/220 |
| 5,406,738 A * | 4/1995 | Holleman, Sr. | ........ | A01K 85/18 |
| | | | | 43/42.15 |
| 7,111,426 B2 * | 9/2006 | Iliev | ................ | A01K 83/06 |
| | | | | 43/26.2 |

FOREIGN PATENT DOCUMENTS

JP        3211458 U       6/2017

* cited by examiner

*Primary Examiner* — Brady W Frazier

(74) *Attorney, Agent, or Firm* — Global IP Counselors, LLP

(57) ABSTRACT

A lure includes a first body, a second body and a first oscillating body. The first body has an internal first space and is configured to at least partially transmit light. The second body is connected to the first body via a connecting structure. The first oscillating body is disposed in the internal first space and is connected to the first body via a connecting part so as to be capable of oscillating.

20 Claims, 7 Drawing Sheets

LURE WITH INTERNAL OSCILLATING BODY

CROSS-REFERENCE TO RELATED APPLICATIONS

This application claims priority to Japanese Patent Application No. 2021-192516, filed on Nov. 26, 2021. The entire disclosure of Japanese Patent Application No. 2021-192516 are hereby incorporated by reference.

BACKGROUND

Field of the Invention

The present disclosure relates to a lure.

Background Art

Some conventional lures have light-transmitting stones attached to a plurality of body sections. For example, the lure of Utility Model Registration No. 3211458 has a plurality of body sections, a connecting structure, and a plurality of light-transmitting stones. The light-transmitting stones are fixed to the surface of each body section. The connecting structure individually connects the plurality of body sections.

SUMMARY

It has been determined that in the prior art described above, since the light-transmitting stones are fixed to the surface of each body section, even if the light-transmitting stones reflect light, the light that is reflected by the light-transmitting stones is monotonous, which reduces the effect of attracting fish. An object of the present disclosure is to provide a lure that can attract fish satisfactorily.

A lure according to one aspect of the present disclosure includes a first body, a second body, and a first oscillating body. The first body contains an internal first space. The first body at least partially transmits light. The second body is connected to the first body via a connecting structure. The first oscillating body is disposed in the first space. The first oscillating body is connected to the first body via a connecting part so as to be able to oscillate.

In this configuration, the first oscillating body is disposed in the first space of the first body. In this configuration, the first oscillating body oscillates with respect to the first body via the connection part. This enables the direction of the light to be changed randomly by the first oscillating body. As a result, with this lure, fish can attracted more satisfactorily compared with the prior art.

In the lure according to another aspect of the present disclosure, the connecting part has a first connecting part and a second connecting part. The first connecting part is preferably connected to the front of the first oscillating body. In this embodiment, the second connecting part is connected to the rear of the first oscillating body.

In the lure according to another aspect of the present disclosure, the connecting part preferably includes an elastic body.

In the lure according to another aspect of the present disclosure, the first body preferably has a concave portion. In this embodiment, at least part of the connecting part is housed in the concave portion.

In the lure according to another aspect of the present disclosure, it is preferred that the concave portion and at least part of the connecting structure overlap as viewed from an orthogonal direction orthogonal to the front-rear direction of the first body.

In the lure according to another aspect of the present disclosure, it is preferred that the lure also includes a weighted body. In this embodiment, the weighted body is provided on the first oscillating body.

In the lure according to another aspect of the present disclosure, the first oscillating body preferably has a hole. In this embodiment, the first body has a convex portion. The convex portion is inserted in the hole. The outer diameter of the convex portion is smaller than the inner diameter of the hole.

In the lure according to another aspect of the present disclosure, the connecting structure preferably has a first support element, a second support element, and a connecting element. In this embodiment, the first support element is provided on the first body. The second support element is provided on the second body. The connecting element is swingably supported with respect to the first support element and the second support element.

In the lure according to another aspect of the present disclosure, the lure preferably also includes a second oscillating body. In this embodiment, the second body has an internal second space. The second oscillating body is disposed in the second space. The second oscillating body is connected to the second body so as to be able to oscillate.

In the lure according to another aspect of the present disclosure, the second oscillating body is preferably configured to reflect light.

In the lure according to another aspect of the present disclosure, the second oscillating body is preferably a fluorescent body.

In the lure according to another aspect of the present disclosure, the first oscillating body is preferably configured to reflect light.

In the lure according to another aspect of the present disclosure, the first oscillating body is preferably a fluorescent body.

In the lure according to another aspect of the present disclosure, the lure preferably also includes a third body. In this embodiment, the third body is connected to either the first body or the second body.

In the lure according to another aspect of the present disclosure, the lure preferably also includes an annular element. In this embodiment, the annular element is provided on the first body for the connection of a fishing line.

By the embodiments disclosed in the present disclosure, an improved lure that can satisfactorily attract fish is disclosed.

DETAILED DESCRIPTION OF EMBODIMENTS

Figure 1:
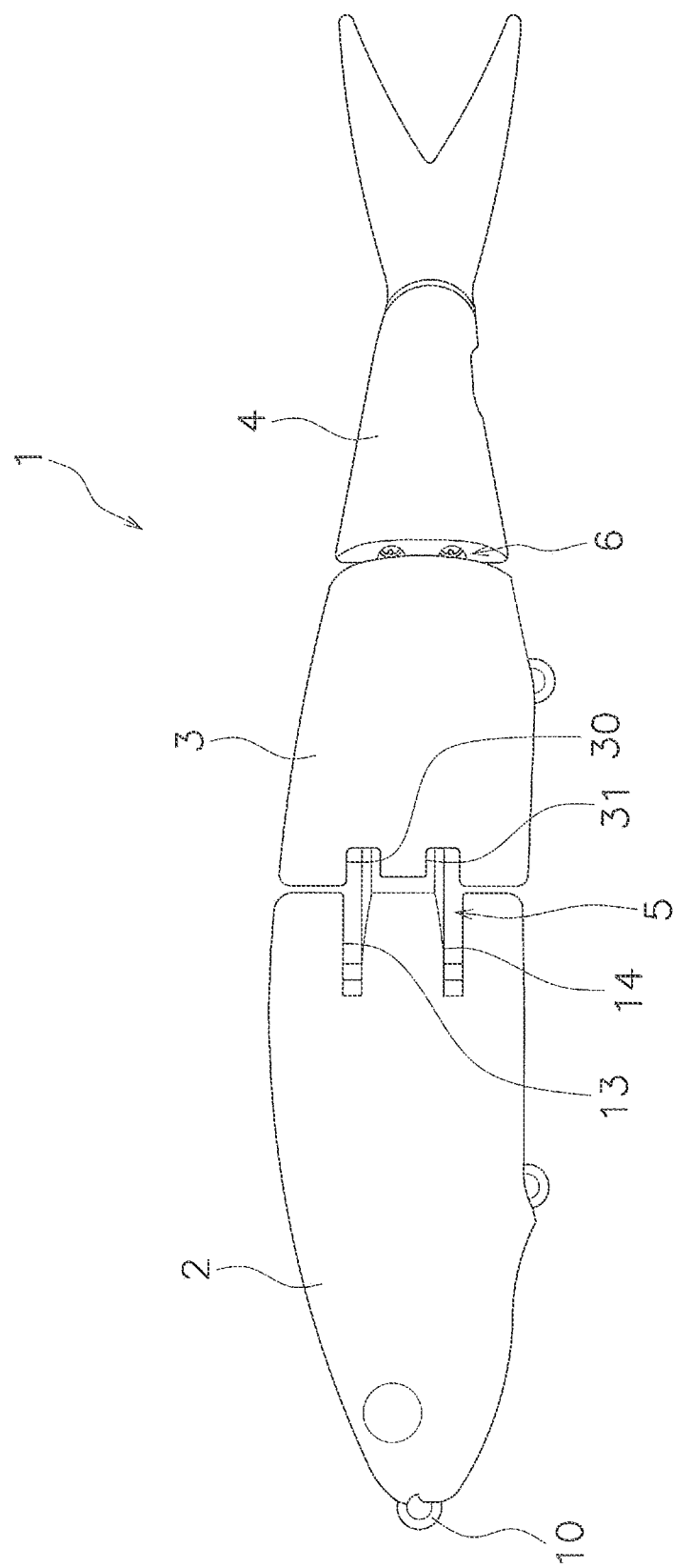
FIG. 1 is a side view of a lure according to an embodiment.
Figure 2:
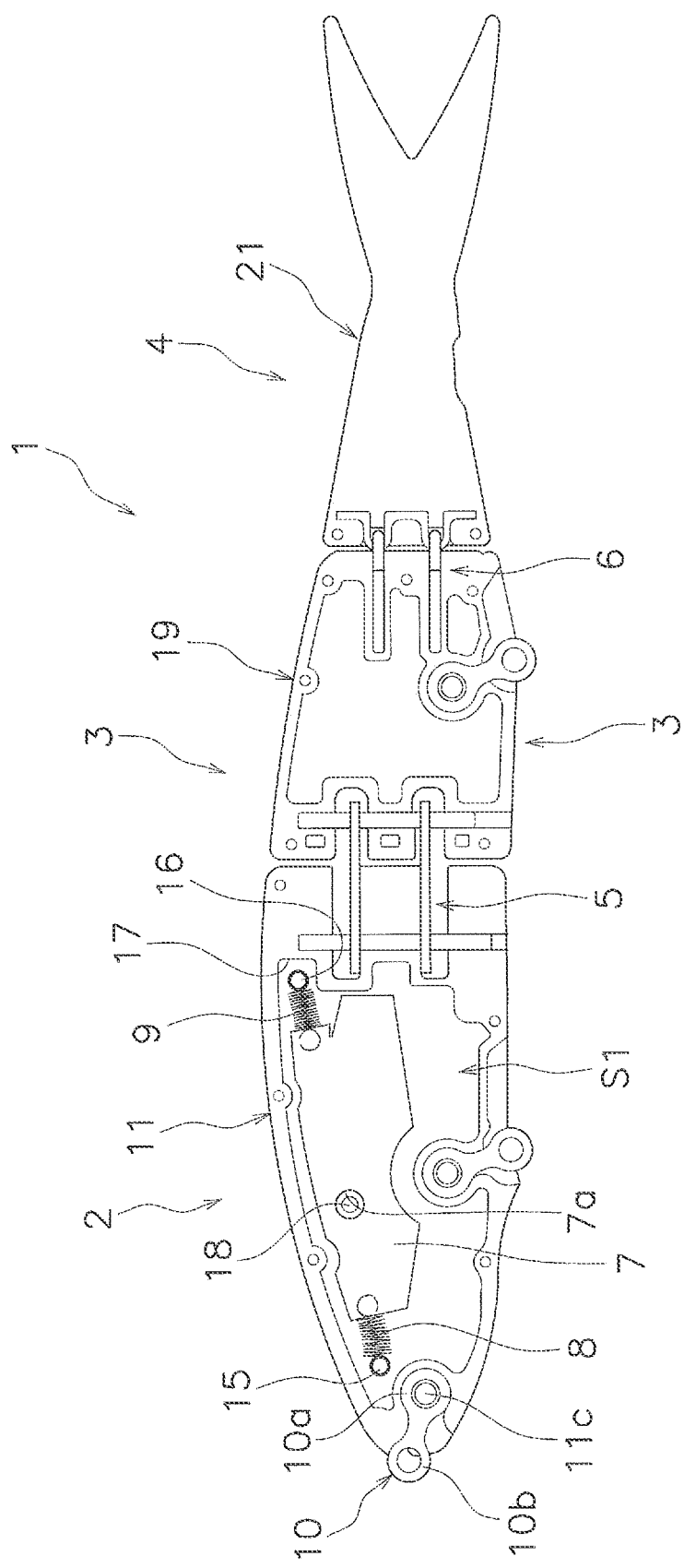
FIG. 2 is a side view in which a second half-body, a fourth half-body, and a sixth half-body have been removed from the lure according to the embodiment.

A lure 1 according to an embodiment will be described below with reference to the drawings. As shown in FIG. 1, the lure 1 comprises a head 2 (one example of a first body), a body 3 (one example of a second body), a tail 4 (one example of a third body), a first connecting structure 5, and a second connecting structure 6. As shown in FIG. 2, the lure 1 includes a first oscillating body 7, a first spring 8 (one example of a first connecting part), and a second spring 9 (one example of a second connecting part). As shown in FIGS. 1 and 2, the lure 1 further comprises a fishing line connecting part 10 (one example of an annular element).

In the present disclosure, the terms indicating the directions "front," "rear," "forward (front side)," "backward (rear side)," "left," "right," "lateral," "upper," and "lower," as well as any other similar direction, are defined as follows.

"Front" and "forward (front side)" indicate the direction of travel in which the lure 1 is pulled by a fishing line to which the lure 1 is attached. "Rear" and "backward (rear side)" are directions opposite to the direction of travel. "Front-rear direction" corresponds to the longitudinal direction of the lure 1. "Forward (front side)" corresponds to one side in the longitudinal direction. "Backward (rear side)" corresponds to the other side in the longitudinal direction.

For example, the left side of FIG. 1 corresponds to "front" and "forward (front side)." The right side of FIG. 1 corresponds to "rear" and "backward (rear side)." The left-right direction of FIG. 1 corresponds to the "front-rear direction."

"Up" and "upward" indicate the direction toward the surface of the water when the lure 1 is moving forward in the water. "Down" and "downward" indicate the direction below and away from the surface of the water. "Left," "right," and "lateral" are defined based on "up" and "down" mentioned above. For example, the upper side of FIG. 1 corresponds to "up" and "upward." The lower side of FIG. 1 corresponds to "down" and "downward." The upper side of FIG. 3 corresponds to the "right." The lower side of FIG. 3 corresponds to the "left."

Figure 3:
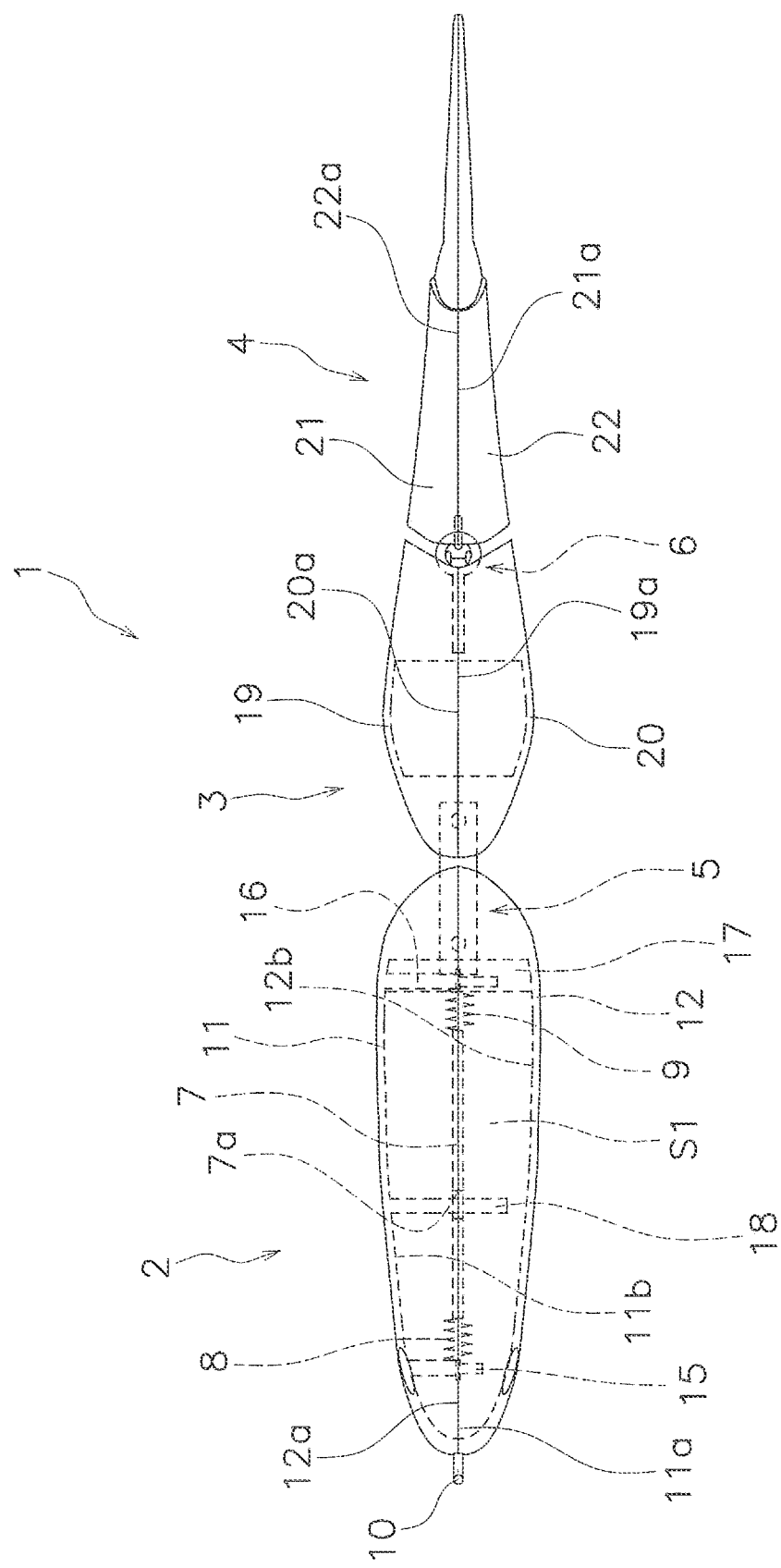
FIG. 3 is a top view of the lure according to the embodiment.

The head 2 shown in FIG. 1 at least partially transmits light. In this embodiment, the head 2 is entirely light-transmissive. As shown in FIGS. 2 and 3, the head 2 has an internal first space S1.

As shown in FIG. 3, the head 2 includes a first half-body 11 and a second half-body 12. That is, in this embodiment, the head 2 is divided into the first and second half-bodies, 11 and 12, respectively, on the left and right sides. The first half-body 11 and the second half-body 12 are separate bodies and are made of resin. For example, the first half-body 11 and the second half-body 12 are made from a transparent or translucent resin.

The first half-body 11 and the second half-body 12 are joined together by welding. For example, the first half-body 11 has a joining surface 11a. The second half-body 12 has a joining surface 12a, with the joining surfaces 11a, 12a extending in the front-rear direction. The first half-body 11 and the second half-body 12 are joined together at the joining surfaces 11a, 12a. For example, the joining surfaces 11a, 12a can be joined together by ultrasonic welding, thus forming the first space S1 between the first half-body 11 and the second half-body 12.

Figure 4:
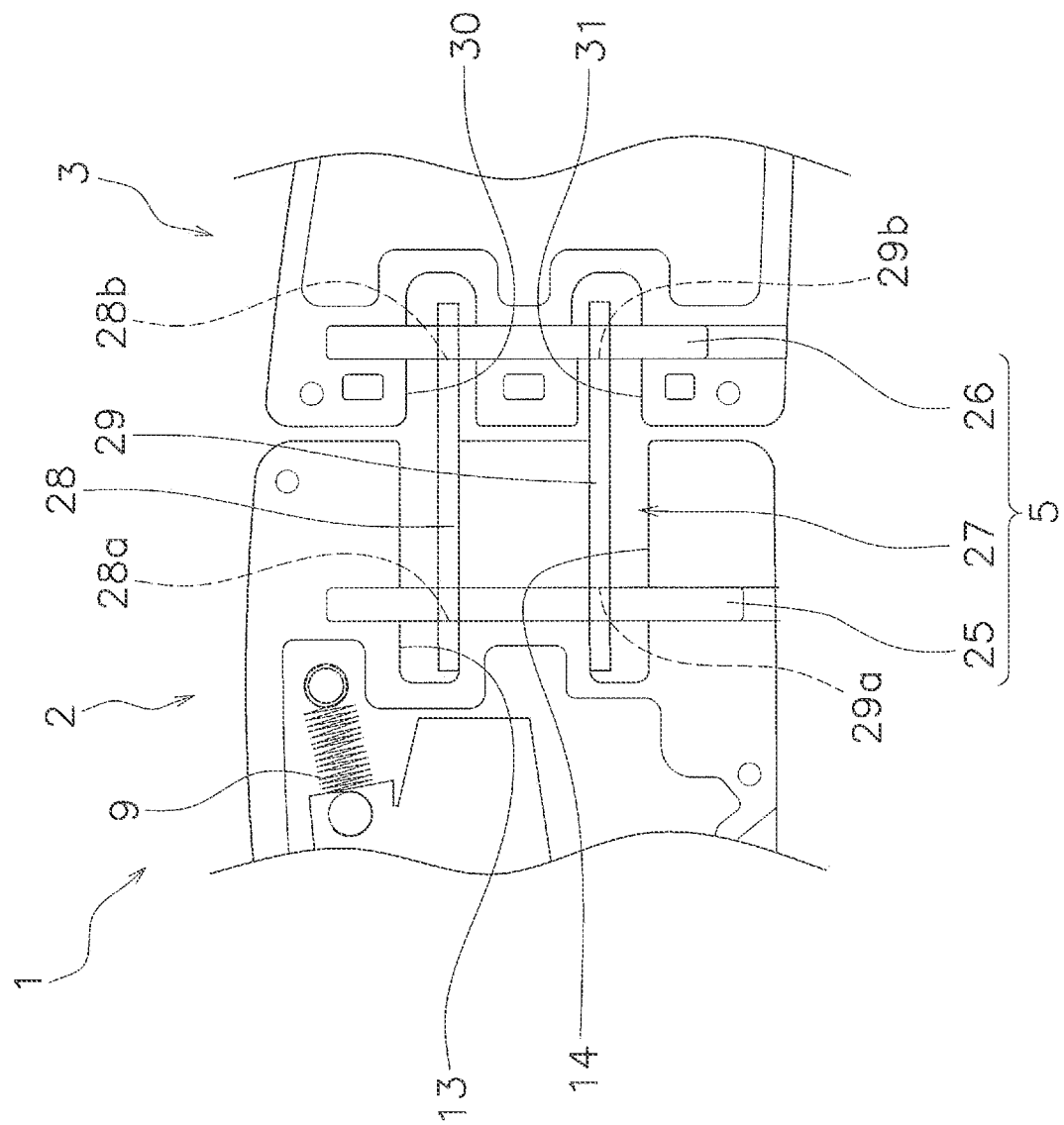
FIG. 4 is a partially enlarged side view of a first connecting structure in FIG. 2.

As shown in FIG. 1, the head 2 includes a first slot 13 and a second slot 14 disposed rearward of the head 2. The first slot 13 and the second slot 14 are spaced apart from each other in the vertical direction when the first half-body 11 and the second half-body 12 are joined together. As shown in FIG. 4, a first plate 28 and a second plate 29 of the first connecting structure 5, described further below, are respectively arranged in the first slot 13 and the second slot 14.

As shown in FIGS. 2 and 3, the head 2 has a first shaft portion 15, a second shaft portion 16, a concave portion 17, and a convex portion 18. The first shaft portion 15 is disposed in the first space S1. For example, the first shaft portion 15 is disposed in the front part of the first space S1. The first shaft portion 15 is arranged in front of the first oscillating body 7.

As shown in FIG. 3, the first shaft portion 15 is connected to an inner surface 11b of the first half-body 11. The first shaft portion 15 extends from the inner surface 11b of the first half-body 11 toward the second half-body 12. The first shaft portion 15 may be connected to an inner surface 12b of the second half-body 12 and extends toward the first half-body 11. The first shaft portion 15 extends in the left-right direction of the lure 1.

As shown in FIGS. 2 and 3, the second shaft portion 16 is disposed in the first space S1. For example, the second shaft portion 16 is disposed in the rear part of the first space S1. The second shaft portion 16 is arranged behind the first oscillating body 7. As shown in FIG. 2, at least part of the second shaft portion 16 is disposed in the concave portion 17. In this embodiment, part of the second shaft portion 16 is disposed in the concave portion 17. The entire second shaft portion 16 can be disposed in the concave portion 17.

As shown in FIG. 3, the second shaft portion 16 is connected to the inner surface 11b of the first half-body 11, and extends from the inner surface 11b of the first half-body 11 toward the second half-body 12. The second shaft portion 16 can be connected to the inner surface 12b of the second half-body 12 and extends toward the first half-body 11. The second shaft portion 16 extends in the left-right direction of the lure 1.

As shown in FIG. 2, the concave portion 17 forms part of the first space S1, and opens forward. As shown in FIG. 4, when the head 2 is viewed from the outside in an orthogonal direction, i.e., orthogonal to the front-rear direction, the concave portion 17 and at least part of the first connecting structure 5 overlap. In this embodiment, when the head 2 is viewed from the outside in the vertical direction, the concave portion 17 and part of the first connecting structure 5 overlap. Specifically, when the head 2 is viewed from the outside in the vertical direction, the concave portion 17 overlaps the front end of a first connecting element 27 (the first plate 28 and the second plate 29) of the first connecting structure 5, described further below.

The concave portion 17 is disposed behind the first oscillating body 7. For example, the concave portion 17 is disposed behind the first oscillating body 7 when the first half-body 11 and the second half-body 12 are joined together. At least part of the second spring 9 is housed within the concave portion 17. In this embodiment, the concave portion 17 houses the rear end of the second spring 9, which internally engages the second shaft portion 16.

As shown in FIGS. 2 and 3, the convex portion 18 is disposed in the first space 51. The convex portion 18 is connected to the inner side surface 11b of the first half-body 11, and extends from the inner side surface 11b of the first half-body 11 toward the second half-body 12. The convex portion 18 can be connected to an inside surface 12b of the second half-body 12 and extend toward the first half-body 11. The convex portion 18 extends in the left-right direction of the lure 1. The convex portion 18 is inserted into a hole 7a of the first oscillating body 7, described further below.

As shown in FIGS. 2 and 3, the first oscillating body 7 is disposed in the first space S1. For example, the first oscillating body 7 is disposed between the first half-body 11 and the second half-body 12 in the left-right direction (refer to FIG. 3). The first oscillating body 7 is disposed between the first shaft portion 15 and the second shaft portion 16 in the front-rear direction. Specifically, the first oscillating body 7 is connected to the head 2 via the first spring 8 and the second spring 9 so as to be capable of oscillating. The first oscillating body 7 is configured to reflect light. The first oscillating body 7 can also be a fluorescent body.

As shown in FIGS. 2 and 3, the first oscillating body 7 has hole 7a that passes through the first oscillating body 7. The hole 7a has a circular shape with an inner diameter that is larger than the outer diameter of the convex portion 18. A C-shaped notch or a U-shaped notch can be used instead of the hole 7a. In this embodiment, the inner dimension of the notch in the front-rear direction is greater than the outer diameter of the convex portion 18.

The convex portion 18 is inserted in the hole 7a. The convex portion 18 is separated from the inside edge of the hole 7a when the first oscillating body 7 is at rest. When the amplitude of the first oscillating body 7 is at a maximum, the convex portion 18 and the inside edge of the hole 7a contact each other. The amplitude of the first oscillating body 7 is thereby suppressed. The amplitude of the first oscillating body 7 is controlled by a gap between the inside edge of the hole 7a and the outer surface of the convex portion 18.

As shown in FIGS. 2 and 3, the first oscillating body 7 is supported by the first spring 8 so as to be capable of oscillating. The first spring 8 is disposed in the first space S1, and is arranged in front of the first oscillating body 7. The first spring 8 is connected to the front side of the first oscillating body 7. For example, the front end of the first spring 8 is connected to the first shaft portion 15. The rear end of the first spring 8 is connected to the front portion of the first oscillating body 7. The first spring 8 can be made from an elastic material different from that of a spring.

The first oscillating body 7 is supported by the second spring 9 so as to be capable of oscillating. The second spring 9 is disposed in the first space S1, and is arranged behind the first oscillating body 7. The second spring 9 is connected to the rear side of the first oscillating body 7. For example, the front end of the second spring 9 is connected to the first oscillating body 7. The rear end of the second spring 9 is connected to the second shaft portion 16. The second spring 9 can be made from an elastic material different from that of a spring.

The first spring 8 and the second spring 9 support the first oscillating body 7 in a floating state within the first space S1. When the first oscillating body 7 moves due to the landing of the lure 1 on the water or the imposed movement of the lure 1, the first spring 8 and the second spring 9 elastically deform. The first oscillating body 7 then moves in the opposite direction due to the elastic force of the first spring 8 and the second spring 9. By repeating the operation described above, the first oscillating body 7 continually oscillates due to the elastic force of the first spring 8 and the second spring 9, even after the lure 1 is at rest.

As shown in FIG. 2, the fishing line connecting part 10 is disposed on the head 2 to connect the fishing line. For example, the fishing line connecting part 10 can be formed in a figure eight. The fishing line connecting part 10 has an attachment portion 10a and a fishing line fastening portion 10b. The attachment portion 10a is pivotably attached to the front part of the head 2. For example, the attachment portion 10a has an annular shape and is pivotably attached to a mounting shaft 11c of the first half-body 11. The fishing line fastening portion 10b and the attachment portion 10a are integrally formed. The fishing line fastening portion 10b has an annular shape.

As shown in FIG. 2, the body 3 is connected to the head 2 via the first connecting structure 5, described further below. For example, the front part of the body 3 is connected to the rear part of the head 2 via the first connecting structure 5. Details of the first connecting structure 5 will be described further below.

As shown in FIG. 3, the body 3 includes a third half-body 19 and a fourth half-body 20. That is, in this embodiment, the body 3 is divided into the third half-body 19 on the left-hand side and the fourth half-body 20 on the right-hand side. The third half-body 19 and the fourth half-body 20 are separate bodies, and can be made of resin.

The third half-body 19 and the fourth half-body 20 are joined together by means of welding. For example, the third half-body 19 has a joining surface 19a, and the fourth half-body 20 has a joining surface 20a, with the joining surfaces 19a, 20a extend in the front-rear direction, and the third half-body 19 and the fourth half-body 20 are joined together at the joining surfaces 19a, 20a. For example, the joining surfaces 19a, 20a can be joined together by ultrasonic welding.

As shown in FIG. 1, the body 3 has a third slot 30 and a fourth slot 31. The third slot 30 and the fourth slot 31 are disposed in the forward part of the body 3. The third slot 30 and the fourth slot 31 are arranged spaced apart from each other in the vertical direction when the third half-body 19 and the fourth half-body 20 are joined together. As shown in FIG. 4, the first plate 28 and the second plate 29 of the first connecting structure 5, described further below, are respectively arranged in the third slot 30 and the fourth slot 31.

As shown in FIG. 2, the tail 4 is connected to the body 3 via the second connecting structure 6, described further below. For example, the front part of the tail 4 is connected to the rear part of the body 3 via the second connecting structure 6. Details of the second connecting structure 6 will be described further below.

As shown in FIG. 3, the tail 4 includes a fifth half-body 21 and a sixth half-body 22. That is, in this embodiment, the tail 4 is divided into the fifth half-body 21 on the left-hand side and a sixth half-body 22 on the right-hand side. The fifth half-body 21 and the sixth half-body 22 are separate bodies, and can be made of resin.

The fifth half-body 21 and the sixth half-body 22 are joined together by welding. For example, the fifth half-body 21 has a joining surface 21a, and the sixth half-body 22 includes a joining surface 22a, with the joining surfaces 21a, 22a extending in the front-rear direction. The fifth half-body 21 and the sixth half-body 22 are joined together at the joining surfaces 21a, 22a. For example, the joining surfaces 21a, 22a can be joined together by ultrasonic welding.

As shown in FIG. 4, the first connecting structure 5 connects the head 2 and the body 3 such that the head 2 and the body 3 can both swing. In this embodiment, the head 2 and the body 3 both swing to the left and right.

The first connecting structure 5 has a first support element 25, a second support element 26, and the first connecting element 27. The first support element 25 is disposed on the head 2. For example, the first support element 25 is a shaft-like element that is long in one direction. The first support element 25 is attached to the rear part of the head 2 such that the longitudinal direction of the first support element 25 is arranged in the vertical direction.

The second support element 26 is disposed on the body 3. For example, the second support element 26 is a shaft-like element that is long in one direction. The second support element 26 is attached to the rear part of the head 2 such that the longitudinal direction of the second support element 26 is arranged in the vertical direction. The second support element 26 is thus arranged parallel to the first support element 25.

The first connecting element 27 is swingably supported by the first support element 25 and the second support element 26. The first connecting element 27 includes the first plate 28 and the second plate 29. The first plate 28 has a pair of first insertion holes 28a, 28b, the first support element 25 is inserted into the first insertion hole 28a, and the second support element 26 is inserted into the first insertion hole 28b. The second plate 29 has a pair of second insertion holes 29a, 29b, the first support element 25 is inserted into the second insertion hole 29a, and the second support element 26 is inserted into the second insertion hole 29b.

Specifically, the first support element 25 is inserted into the first insertion hole 28a and the second insertion hole 29a, and the second support element 26 is inserted into the first insertion hole 28b and the second insertion hole 29b. In this state, the first support element 25 is sandwiched by the first half-body 11 and the second half-body 12, and the second support element 26 is sandwiched by the third half-body 19 and the fourth half-body 20.

As a result, the front part of the first plate 28 and the front part of the second plate 29 are separately arranged in the first slot 13 and the second slot 14, respectively. The rear part of the first plate 28 and the rear part of the second plate 29 are separately arranged in the third slot 30 and the fourth slot 31, respectively. In this state, the longitudinal direction of the first support element 25 is arranged in the vertical direction, and the longitudinal direction of the second support element 26 is arranged in the vertical direction.

Figure 5:
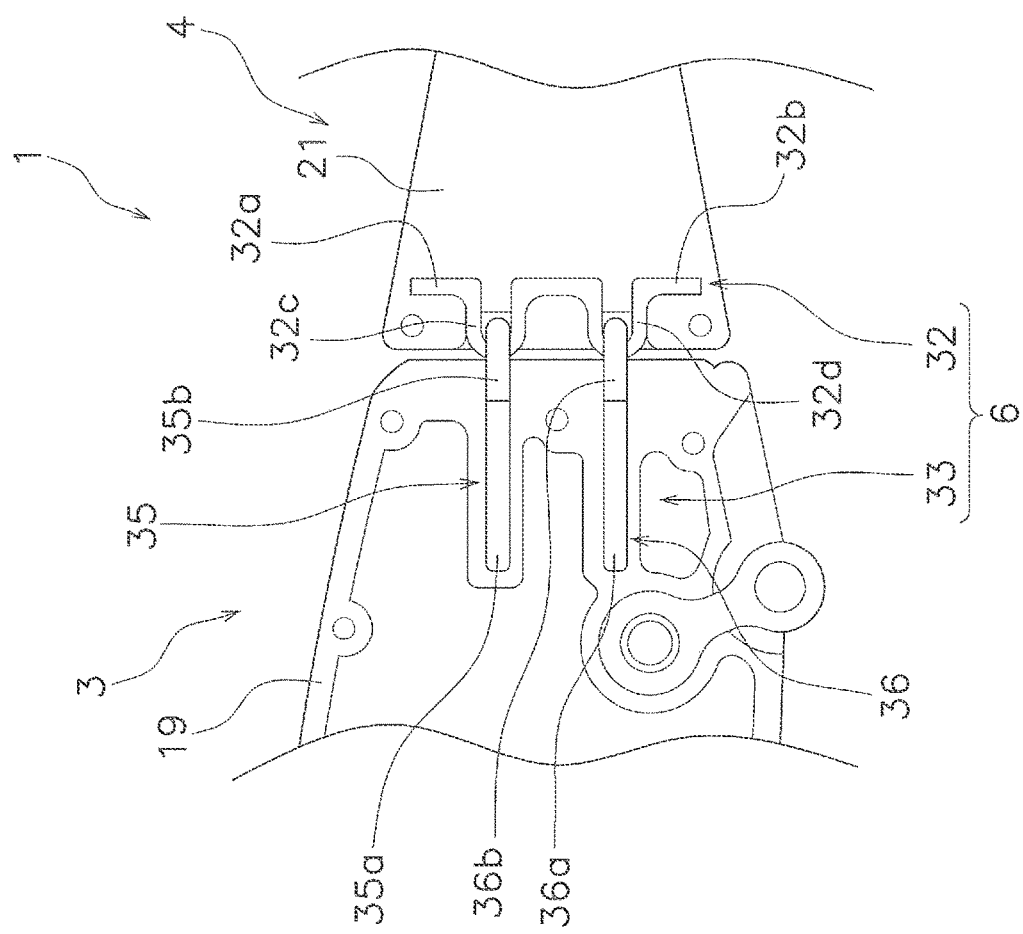
FIG. 5 is a partially enlarged side view of a second connecting structure in FIG. 2.

As shown in FIG. 5, the second connecting structure 6 connects the body 3 and the tail 4 such that the body 3 and the tail 4 can swing with respect to each other. In this embodiment, the body 3 and the tail 4 can swing each other to the left and right.

The second connecting structure 6 has a third support element 32 and a second connecting element 33. The third support element 32 is disposed on the tail 4. For example, the third support element 32 has a pair of attachment portions 32a, 32b, a first engagement portion 32c, and a second engagement portion 32d. The pair of attachment portions 32a, 32b is attached to the front part of the tail 4.

The first engagement portion 32c is U-shaped, and is integrally formed with the attachment portion 32a and the second engagement portion 32d. The second engagement portion 32d is U-shaped, and is integrally formed with the attachment portion 32b and the first engagement portion 32c.

The second connecting element 33 is swingably supported with respect to the third support element 32, and has a first engagement element 35 and a second engagement element 36. The first engagement element 35 has an attachment portion 35a and a first annular portion 35b.

The attachment portion 35a is attached to the rear part of the body 3. The first annular portion 35b is integrally formed with the attachment portion 35a. The first engagement portion 32c engages the first annular portion 35b. The second engagement element 36 has an attachment portion 36a and a second annular portion 36b. The attachment portion 36a is attached to the rear part of the body 3. The second annular portion 36b is integrally formed with the attachment portion 36a. The second engagement portion 32d engages the second annular portion 36b.

Specifically, the third support element 32 is inserted into the first annular portion 35b of the first engagement element 35 and the second annular portion 36b of the second engagement element 36. Thus, the first engagement portion 32c of the third support element 32 engages the first annular portion 35b of the first engagement element 35, and the second engagement portion 32d of the third support element 32 engages with the second annular portion 36b of the second engagement element 36.

In this state, the attachment portion 35a of the first engagement element 35 and the attachment portion 36a of the second engagement element 36 are sandwiched by the third half-body 19 and the fourth half-body 20. The attachment portions 32a, 32b of the third support element 32 are sandwiched by the fifth half-body 21 and the sixth half-body 22. The first annular portion 35b of the first engagement element 35 and the second annular portion 36b of the second engagement element 36 are thereby arranged spaced apart from each other in the vertical direction.

The above-described embodiment can be modified as follows.

Modified Example 1

Figure 6:
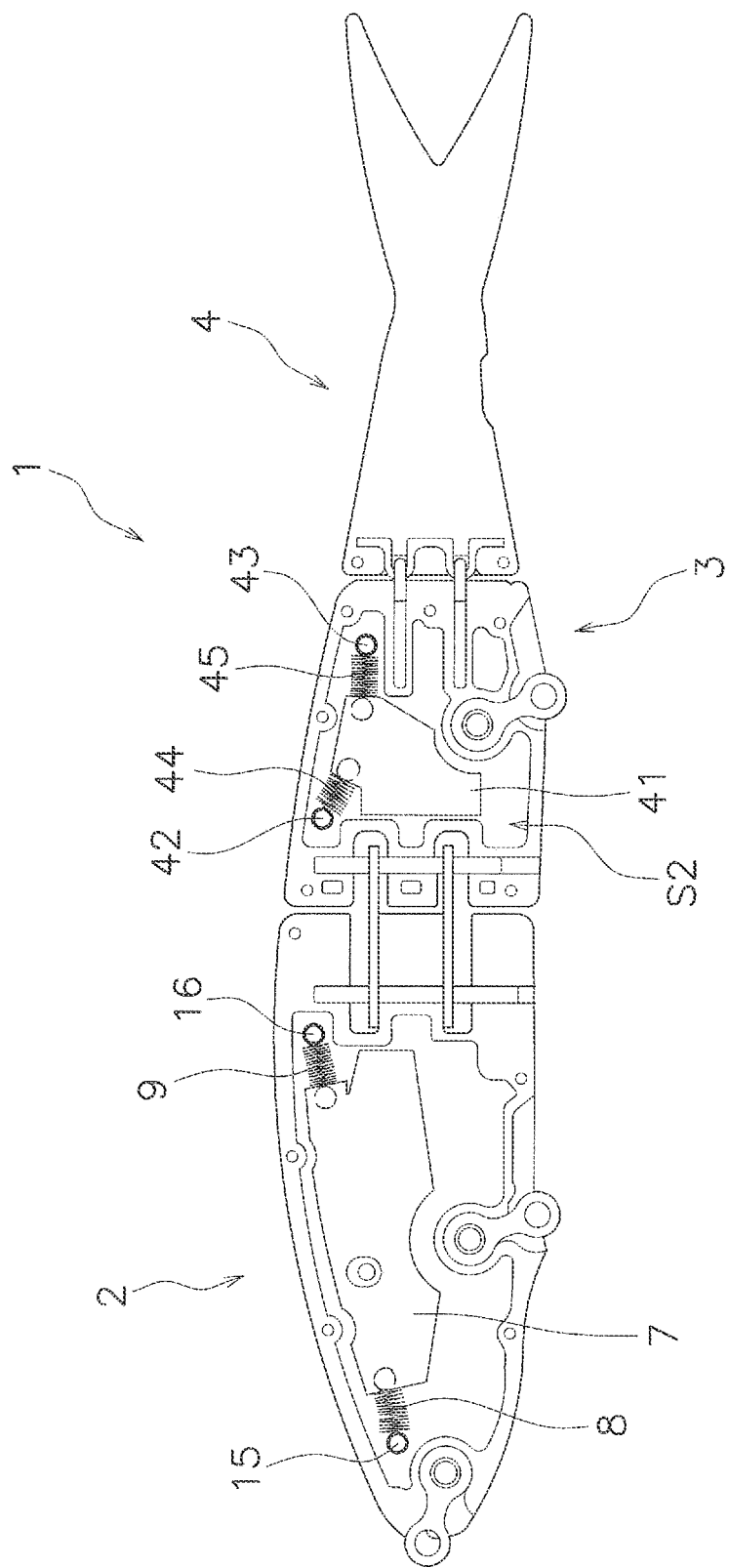
FIG. 6 is a side view in which the second half-body, the fourth half-body, and the sixth half-body have been removed from the lure according to Modified Example 1.

As shown in FIG. 6, the lure 1 can further comprise a second oscillating body 41. The body 3 has a second space S2. The second oscillating body 41 is disposed in the second space S2. The second oscillating body 41 is connected to the body 3 so as to be capable of oscillating. The body 3 at least partially transmits light. In this embodiment, the body 3 is entirely light-transmissive.

For example, the second oscillating body 41 is disposed between the fifth half-body 21 and the sixth half-body 22 in the left-right direction. That is, in this embodiment, the second oscillating body 41 is disposed between a third shaft portion 42 and a fourth shaft portion 43 in the front-rear direction. The second oscillating body 41 is configured to reflect light. The second oscillating body 41 can also be a fluorescent body.

Specifically, the second oscillating body 41 is connected to the body 3 via a third spring 44 and a fourth spring 45 so as to be capable of oscillating. The third spring 44 is connected to the front side of the second oscillating body 41. For example, the front end of the third spring 44 is connected to the third shaft portion 42. The rear end of the third spring 44 is connected to the front part of the second oscillating body 41. The third spring 44 can be made from an elastic material different from that of a spring.

The fourth spring 45 is connected to the rear side of the second oscillating body 41. For example, the front end of the fourth spring 45 is connected to the rear part of the second oscillating body 41. The rear end of the fourth spring 45 is connected to the fourth shaft portion 43. The fourth spring 45 can be made from an elastic material different from that of a spring.

Modified Example 2

Figure 7:
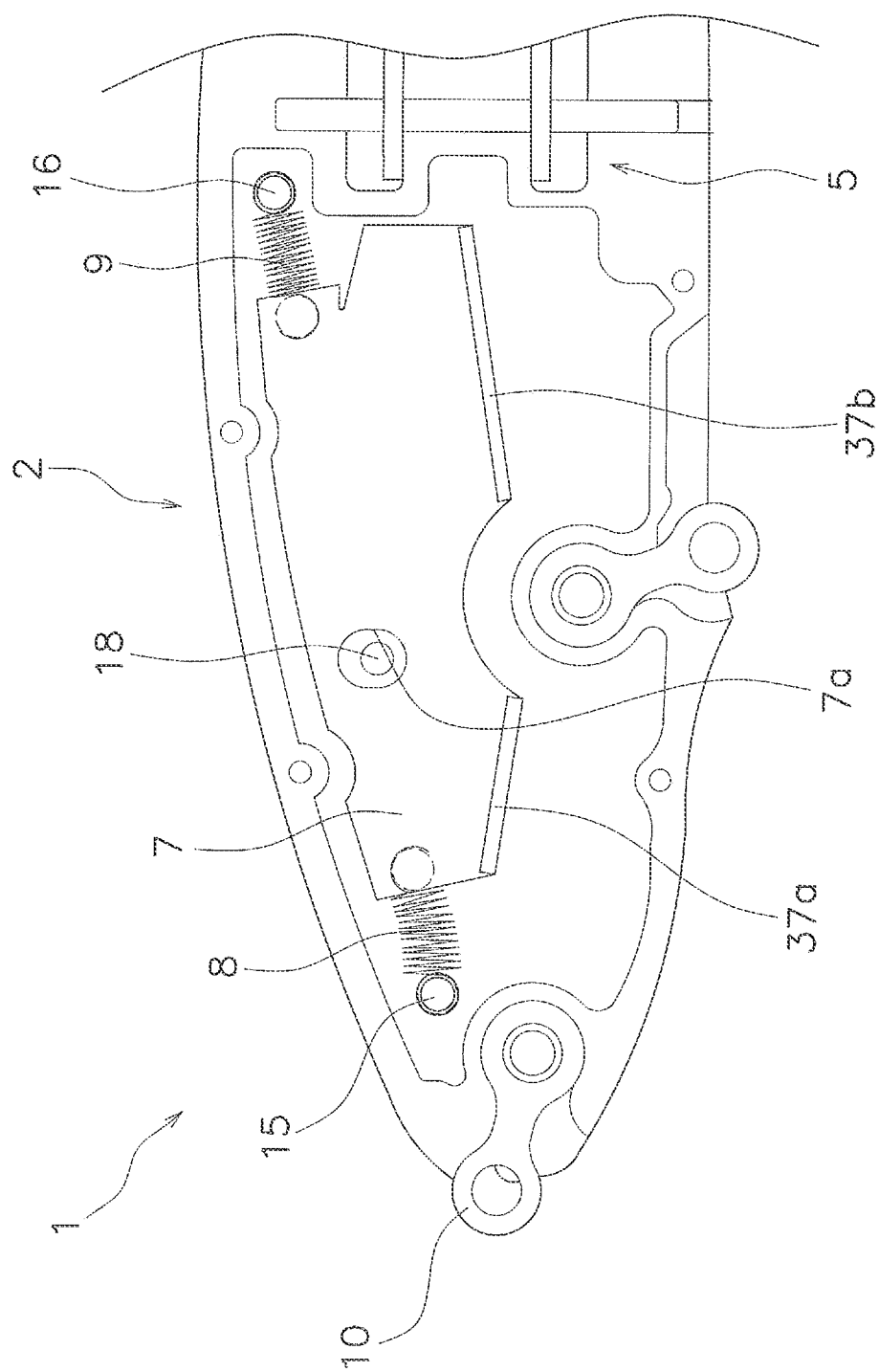
FIG. 7 is a side view in which the second half-body has been removed from a head part of the lure according to Modified Example 2.

As shown in FIG. 7, the lure 1 can further comprise weights 37a, 37b. The weights 37a, 37b are disposed on the first oscillating body 7. For example, the weights 37a, 37b are disposed below the first spring 8 and the second spring 9. The weights 37a, 37b are attached to the lower end of the first oscillating body 7, and due to the weights, the first oscillating body 7 can be easily oscillated.

The weights 37a, 37b can be disposed on the second oscillating body 41 of the above-described Modified Example 1. In this embodiment, the weights 37a, 37b are set below the third spring 44 and the fourth spring 45.

OTHER EMBODIMENTS

An embodiment is described above in which the lure 1 is composed of the head 2, the body 3, and the tail 4. However, as can be understood, the lure 1 can be composed of the head 2 and the tail 4, without using the body 3. In this embodiment, the head 2 and the tail 4 are connected to each other by the first connecting structure 5 in the same manner as the embodiment described above. The lure 1 can also be formed with the body 3 and the tail 4 in a single piece without using the second connecting structure 6. In this embodiment, the head 2, and the body 3 and the tail 4 swing together.

By the embodiments disclosed in the present disclosure, an improved lure that can satisfactorily attract fish is disclosed.

What is claimed is:

1. A lure, comprising:
    a first body having an internal first space and being configured to at least partially transmit light;
    a second body connected to the first body via a connecting structure; and
    a first oscillating body disposed in the internal first space and connected to the first body via a connecting part so as to be capable of oscillating,
    the connecting structure having a first support element disposed on the first body, a second support element disposed on the second body, and a connecting element that is configured to enable the second body to be swingable with respect to the first body.

2. The lure according to claim 1, wherein
    the connecting part includes a first connecting part connected to a front side of the first oscillating body and a second connection part connected to a rear side of the first oscillating body.

3. The lure according to claim 1, wherein
    the connecting part includes an elastic body.

4. The lure according to claim 1, wherein
    the first body has a concave portion that internally houses at least part of the connecting part.

5. The lure according to claim 4, wherein
    the concave portion and at least part of the connecting structure overlap as viewed from an orthogonal direction orthogonal to a front-rear direction of the first body.

6. The lure according to claim 1, further comprising
    a weighted body disposed on the first oscillating body.

7. A lure, comprising:
    a first body having an internal first space and being configured to at least partially transmit light;
    a second body connected to the first body via a connecting structure; and
    a first oscillating body disposed in the internal first space and connected to the first body via a connecting part so as to be capable of oscillating,
    the first oscillating body having a hole,
    the first body having a convex portion that is inserted into the hole, and
    an outer diameter of the convex portion being smaller than an internal diameter of the hole.

8. The lure according to claim 1, wherein
    the connecting element is swingable with respect to the first support element and the second support element.

9. The lure according to claim 1, wherein
    the second body has an internal second space, and
    a second oscillating body is disposed in the second space and is connected to the second body so as to be capable of oscillating.

10. The lure according to claim 9, wherein
    the second oscillating body is configured to reflect light.

11. The lure according to claim 9, wherein
    the second oscillating body is a fluorescent body.

12. The lure according to claim 1, wherein
    the first oscillating body is configured to reflect light.

13. The lure according to claim 1, wherein
    the first oscillating body is a fluorescent body.

14. The lure according to claim 1, further comprising
    a third body connected to one of the first body or the second body.

15. The lure according to claim 1, further comprising
    an annular element disposed on the first body to connect a fishing line.

16. The lure according to claim 1, wherein the first oscillating body has a flat surface configured to reflect light.

17. The lure according to claim 1, wherein the first oscillating body has a rigid structure.

18. The lure according to claim 1, wherein the first oscillating body is a plate.

19. The lure according to claim 1, wherein the connecting structure is configured to enable the second body to be swingable about an axis of rotation with respect to the first body.

20. The lure according to claim 1, wherein the connecting structure is configured to enable the second body to only swing to the left and the right with respect to the first body.

* * * * *